Patented Apr. 10, 1934

1,954,584

UNITED STATES PATENT OFFICE 1,954,584

METHOD OF MAKING HYDROUS DEXTROSE

Charles J. Copland, Kansas City, Mo., and William B. Newkirk, Western Springs, Ill., assignors to International Patents Development Company, Wilmington, Del., a corporation of Delaware No Drawing. Application November 26, 1929, Serial No. 409,995

14 Claims. (Cl. 127—58)

This invention relates to the manufacture from starch of hydrous dextrose and the object of the invention is to provide a method of bringing about the crystallization of the sugar in a starch converted dextrose solution without the use of solid phase as seed, either in the form of dry crystals or "foots", by which latter is intended the mixture of sugar crystals and mother liquor from a previous crystallization.

In the following description of the preferred method of practicing the invention, a starch converted liquor of 89 per cent to 90 per cent purity (dextrose content by weight on dry substance basis) and a batch of 100,000 to 105,000 pounds will be assumed. The density of the liquor is approximately 40° Baumé and comes from the vacuum pan at a temperature of about 135° to 140° F.

5,000 pounds of this solution is run into an empty crystallizer and cooled as rapidly as possible, by circulation of water through the water jacket of the crystallizer, to a temperature of about 100° F. The crystallizer has the usual agitator which is revolved at the usual rate. That is, one revolution in from three to six minutes. The liquor could be cooled in a separate cooler and run into the crystallizer at the temperature indicated. Spontaneous crystallization takes place and as soon as the massecuite becomes thick with crystals, which will be in about eight hours, 30,000 pounds of the converted liquor is run into the crystallizer at a temperature of 135 to 140° F. and the mixture is allowed to cool, ordinarily without application of water, until the massecuite is fairly thick, but still free flowing, not pasty, which will ordinarily be in about sixteen hours after the 30,000 pound increment is added; whereupon the rest of the batch of converted liquor, namely about 70,000 pounds, is introduced into the crystallizer at the vacuum pan temperature of 135° to 140° F. The crystallization is then permitted to proceed by gradual reduction of temperature, without the application of water, until its temperature reaches the temperature of the crystallizing room, which may be in the neighborhood of from 80° to 95° F. or somewhat lower than that range in cold weather. When crystallization is complete, which will be in about 96 hours after the 70,000 pound increment has been added, the massecuite is removed and the mother liquor or hydrol spun out in centrifugal machines or otherwise removed. The agitation is continued throughout the crystallizing operation.

The same general method of procedure may be employed for the crystallization of dextrose from the hydrols or mother liquors removed from massecuites produced as above described, with variations, however, as follows: 5,000 pounds of a batch of 105,000 pounds of hydrol, which may have a purity of 78 to 84 per cent and a density of 40 to 42 degrees Baumé is cooled to 80° F., preferably by artificial cooling through circulation of water through the crystallizer jacket and crystallization allowed to proceed for about 48 hours, whereupon 30,000 pounds of the liquor at a temperature of approximately 135 to 140° F. is added. After crystallization has proceeded for another 48 hours, 70,000 pounds of the liquor is added and crystallization allowed to proceed for about 10 days longer.

The method may also be applied to crystallization from a second hydrol (mother liquor from the centrifuging of a massecuite made by crystallization of first hydrol), which second hydrol may have a purity of 68 to 75 per cent and a density of 40 to 42 degrees Baumé; the procedure being the same as with the treatment of the first hydrol except that the periods between additions of the solution and after the crystalizer has been filled must be longer, due to the lower purity of the liquor treated.

The method may also be applied to reconverted hydrols, that is to say, to hydrols in which the polysaccharide sugars have been hydrolyzed to convert them to dextrose, such liquors ordinarily having purities ranging from 86 per cent to 88 per cent. With such liquors, the cooling of the first portion of the batch for spontaneous conversion will be carried further than is the case with converter liquors of 89 per cent to 90 per cent purity, but less than with lower purity hydrols. Similarly the process will take longer than required for ordinary converter liquors but less time than is necessary for the lower purity hydrols.

The process can be hastened by cooling the initial portion of the batch in each case to a lower temperature than specified above. For example, for the first sugar (made from converter liquor) the temperature may be reduced to 85° F.; for second and third sugars to 70° F. and in the case of reconverted hydrols having a purity of 87 per cent, the temperature may be reduced to about 80° F. But cooling to these lower temperatures requires close supervision and the operator should have on hand some additional liquor at 135° to 140° F. ready to add at any time when the false grain in minute malformed crystals, seem to be produced in too large quantities.

For the initial step of inducing spontaneous crystallization, by which is intended crystallization produced without solid phase as induction seed, it is possible to use more or less than 5000 pounds of the batch. A variation here of from 3 per cent to 7 per cent by weight of the batch is possible. The first increment of fresh liquor may also be varied, say from 20 per cent to 40 per cent of the batch.

Generally speaking no anhydride, as a matter of fact, seems to be developed when the process is carried on as above described. As is known to the art the anhydrous crystals ordinarily develop in pure solutions at temperatures above 120° Fahrenheit while the normal hydrate range for pure solutions is below 120° Fahrenheit. This range will vary, however, depending upon the character of the converted liquor, particularly as to impurities. The initial batch will contain a considerable portion of malformed crystals and extremely small normal crystals and possibly some anhydrous crystals and will not purge but as the remaining increments are added, normal hydrate conditions prevail, which transform the malformed crystals into normal hydrate crystals, by which we mean crystals of the typical form for the hydrate of sufficient magnitude in three dimensions to permit the outflow of hydrol and wash water during the centrifuging operation.

From the above specific examples and suggestions for possible variations, it will be seen that definite relations exist between purity, density and the temperatures employed. The lower the purity and density of the liquor treated, the further down on the thermometer scale it can be cooled for inducing the initial, spontaneous crystallization. This cooling can be carried further in each case than has been specified as preferred, but with the risk that unpurgable magmas will be produced unless special supervision is exercised.

It is obvious, therefore, that the invention can be utilized, to some advantage at least, even though there is considerable departure from the preferred methods indicated above. The preferred methods described are predicated on certain customary purities that may be varied up and down by changes in methods of conversion of the starch or by the expedient of using mixtures of converter liquors, hydrols and wash waters. With the directions given above, however, those skilled in this art will have no difficulty in applying the principles of the invention to whatever type of starch converted dextrose solution may be available for use provided, however, that the purity of said liquor is not so high as to prevent spontaneous crystallization of the dextrose as hydrate.

The intention is to cover all modifications of the improved method within the scope of the appended claims.

We claim:

1. Method of making hydrous dextrose from a starch converted dextrose solution in accordance with which spontaneous crystallization is brought about by temperature reduction in a portion previously heated of the batch of solution and the rest of the solution, at a higher temperature, added at intervals to the massecuite thus produced and the temperature of the mixture reduced to a temperature favorable to crystallization of the hydrate to bring about further crystallization while the solid phase is maintained in dispersion through the liquid.

2. Method of making hydrous dextrose from a starch converted dextrose solution in accordance with which spontaneous crystallization is brought about by temperature reduction in a previously heated portion of the batch of solution and the rest of the solution, at a higher temperature, added to the massecuite thus produced, the temperature of the mixture reduced to a temperature favorable to crystallization of the hydrate to bring about further crystallization, while the solid phase is maintained in dispersion through the liquid.

3. Method of making hydrous dextrose from a starch converted dextrose solution in accordance with which spontaneous crystallization is brought about by temperature reduction in a portion from 3 per cent to 7 per cent of the batch of previously heated solution and the rest of the solution, at a higher temperature, added to the massecuite thus produced and the temperature of the mixture reduced to bring about further crystallization.

4. Method of making hydrous dextrose from a starch converted dextrose solution having a density of 39° to 42° Baumé in accordance with which spontaneous crystallization is brought about by temperature reduction in a previously heated portion from 3 per cent to 7 per cent of the batch of solution and the rest of the batch of solution, at a higher temperature added at intervals to the massecuite thus produced, the temperature of the mixture reduced to bring about further crystallization and the solid phase as formed maintained in dispersion through the liquid.

5. Method of making hydrous dextrose from a starch converted dextrose solution in accordance with which spontaneous crystallization is brought about by cooling a portion of the batch of solution to a temperature from 100° F. to 70° F. and the rest of the solution, at a temperature of from 125° to 140° F. added to the massecuite thus produced, and the temperature of the mixture reduced to substantially room temperature to bring about further crystallization.

6. Method of making hydrous dextrose from a starch converted dextrose solution in accordance with which spontaneous crystallization is brought about by cooling a portion of the batch of solution to a temperature from 100° F. to 70° F. and the rest of the solution, at a temperature of from 125° to 140° F. added to the massecuite thus produced, the temperature of the mixture reduced to substantially room temperature to bring about further crystallization, and the solid phase as formed maintained in dispersion through the liquid during the crystallizing operation.

7. Method of making hydrous dextrose from a starch converted dextrose solution having a density of from 39° Baumé to 42° Baumé in accordance with which spontaneous crystallization is brought about in a portion consisting of from 3 per cent to 7 per cent of the batch of solution by cooling such portion to a temperature of from 100° F. to 70° F., the rest of the solution, at a temperature of from 125° F. to 140° F. added to the massecuite thus produced and the temperature of the mixture reduced to bring about further crystallization.

8. Method of making hydrous dextrose from a starch converted dextrose solution having a density of from 39° Baumé to 42° Baumé in accordance with which spontaneous crystallization is brought about in a portion consisting of from 3 per cent to 7 per cent of the batch of solution by cooling such portion to a temperature of from 100° F. to 70° F., the rest of the solution, at a temperature of from 125° F. to 140° F. added at intervals to the massecuite thus produced and the temperature of the mixture reduced to bring about further crystallization.

9. Method of making hydrous dextrose from a starch converted dextrose solution having a density of from 39° Baumé to 42° Baumé in accordance with which spontaneous crystallization is brought about in a portion consisting of from 3 per cent to 7 per cent of the batch of solution by cooling such portion to a temperature of from 100° to 70° F., the rest of the solution, at a temperature of from 125° F. to 140° F. added at intervals to the massecuite thus produced, the temperature of the mixture reduced to bring about further crystallization, and the solid phase as formed maintained in dispersion through the liquid.

10. Method of making hydrous dextrose from a starch converted dextrose solution having a density of from 39° Baumé to 42° Baumé in accordance with which spontaneous crystallization is brought about by cooling a portion of from 3 per cent to 7 per cent of the batch of solution to a temperature from 100° F. to 70° F., to which from 20 per cent to 40 per cent of the solution, at a temperature of from 125° to 140° F. is added and after an interval the rest of the batch of solution whereupon the massecuite is allowed to cool to substantially room temperature and is agitated to keep the solid phase as formed in dispersion through the liquid.

11. Method of making hydrous dextrose from a starch converted dextrose solution having a purity of 89 to 90 per cent and a density of from 39° Baumé to 42° Baumé in accordance with which approximately 5 per cent of the batch of solution is cooled to a temperature of from 100° F. to 85° F., 20 per cent to 40 per cent of the solution at a temperature of 125° to 140° F. added to the massecuite thus formed, and after an interval the rest of the solution at said temperature of 125° to 140° F., and the massecuite allowed to cool to substantially room temperature while it is kept in agitation.

12. Method of making hydrous dextrose from a starch converted dextrose solution of a purity of 89 per cent to 90 per cent and a density of approximately 40° Baumé in accordance with which spontaneous crystallization is brought about by cooling approximately 5% of the solution to a temperature of about 100° F., about 30% of the batch of solution at a temperature of about 125° to 140° F. added to the massecuite thus formed, and after an interval the rest of the solution batch at said temperature of 125° to 140° F. added and the massecuite allowed to cool to approximately room temperature while being kept in agitation.

13. Method of making hydrous dextrose from a starch converted dextrose solution in accordance with which spontaneous crystallization is brought about by temperature reduction in a previously heated portion of the batch of solution and the rest of the solution, at a higher temperature, added to the massecuite thus produced in increments proportioned to the amount of solid phase present and the mixture of massecuite and solution cooled to a temperature favorable to crystallization of the hydrate and agitated to keep the solid phase dispersed in the liquid so that the solid phase will always be a significant factor in controlling crystallization.

14. Method of making hydrous dextrose from a starch converted dextrose solution in accordance with which spontaneous crystallization is brought about by temperature reduction in a previously heated portion of solution; thereafter solution at a higher temperature added to the massecuite thus produced, in proportion to the amount of solid phase present, so that the solid phase will be a significant factor in controlling crystallization; and the mixture of the originally produced massecuite and added fresh solution then reduced to a temperature favorable to the crystallization of the hydrate and agitated to keep the solid phase dispersed in the liquid.

CHARLES J. COPLAND.
WILLIAM B. NEWKIRK.